United States Patent Office 3,770,855
Patented Nov. 6, 1973

3,770,855
PROCESS FOR PRODUCING PHOSPHATE ESTER SURFACE ACTIVE COMPOSITIONS
Albert Benson, Fairlawn, Marvin Mausner, Teaneck, and William Carasik, Ridgewood, N.J., assignors to Witco Chemical Company, Inc., New York, N.Y.
No Drawing. Filed Dec. 15, 1967, Ser. No. 690,731
Int. Cl. C11d 3/36; C07f 9/08
U.S. Cl. 260—987                                                        2 Claims

ABSTRACT OF THE DISCLOSURE

Phosphoric acid ester compositions prepared by phosphorylating a nonionic surface active agent selected from the group consisting of hydroxylic organic compounds containing at least 6 carbon atoms and a reactive hydrogen atom, alkylene oxide adducts of said hydroxylic organic compounds substantially free of polyglycol by-products and mixtures thereof and then hydrolyzing the phosphate ester with at least about 0.5% weight of water exhibit substantially improved product color and clarity and resistance to discoloration and acid drift in storage. The products so produced are useful in liquid detergents and dry-cleaning compositions.

---

This invention relates to the production of surface active compositions, and more particularly to an improved process for preparing surface active compositions containing mixtures of primary and secondary phosphate esters of hydroxylic organic compounds.

Phosphate ester surface active agents are well known and numerous methods for preparing these materials have been disclosed, as for instance, in U.S. Pats. Nos. 1,944,-530; 2,052,029; 2,656,372; 3,004,056; 3,004,057; 3,033,-889; 3,042,697 and 3,088,917.

While many of these known processes are highly effective it has been found that the products thus produced are somewhat colored, appear hazy or cloudy and are unstable as to color and acidity during storage.

Clear, light colored products are required in many uses for surface active agents and many formulators of such compositions, have, for instance, rigid color specifications for liquid detergents and filterability requirements for dry cleaning compositions. Furthermore, the acid drift tendencies of the esters during storage can lead to serious corrosion problems and must be remedied.

In accordance with the practice of the present invention it has been discovered that mono and di phosphate esters and mixtures thereof exhibiting surprisingly improved color characteristics and substantially increased color and pH storage stability are obtained by reacting 1 mole of $P_2O_5$ with 2 to 4.5 moles of a nonionic surface active agent under substantially anhydrous conditions and then hydrolyzing the phosphate ester with at least about 0.5% by weight of water at a temperature below the decomposition temperature of the phosphate ester.

Further it has been discovered that, when the nonionic surface active agents employed as reactants in the present invention are the alkylene oxide adducts of organic hydroxylic compounds containing at least 6 carbon atoms, said adducts advantageously contain less than about 0.5% by weight of polyglycol by-products having a molecular weight greater than 1000.

The nonionic surface active agents suitable for use in preparing the phosphate esters according to the process of the present invention generally comprise hydroxylic organic compounds containing at least 6 carbon atoms and a reactive hydrogen atom and preferably the alkylene oxide condensation products of said hydroxylic organic compounds.

The alkylene oxide hydroxylic organic compound condensation products employed as reactants in the present invention are well known in the art and are disclosed along with suitable methods for their preparation in numerous patents and other publications. In general, they may be obtained by condensing an alkylene oxide such as propylene oxide, butylene oxide, or preferably ethylene oxide with an organic compound containing at least 6 carbon atoms and a reactive hydrogen atom. As suitable compounds containing a reactive hydrogen atom there may be mentioned straight and branched chain aliphatic alcohols, containing at least 6 carbon atoms, particularly linear and branched chain saturated alcohols containing from 8 to 18 carbon atoms, and phenols, particularly the mono or di-alkyl phenols containing from about 4 to 20 carbon atoms in the alkyl radical.

The amount of alkylene oxide condensed with the hydroxylic organic compound herein described is variable within quite wide limits, and will depend primarily upon the particular compound with which it is condensed and may be readily determined in any particular case by preliminary test and routine experimentation. In general, at least two moles of alkylene oxide, preferably ethylene oxide, are condensed with one mole of the hydroxylic organic compound herein described and preferably between about 6 and 14 moles of ethylene oxide per mole of alkyl phenol and between about 4 and 12 moles of ethylene oxide per mole of aliphatic alcohol.

By-products of the alkylene oxide condensation reaction are high molecular weight polyglycols. It has been discovered that the presence of these polyglycols in the phosphate ester product is a cause of a hazy, cloudy product, particularly when the phosphate ester is used in conjunction with organic dry cleaning solvents. Accordingly it is highly advantageous to employ alkylene oxide condensation products in the preparation of phosphate esters in accordance with the practice of the present invention that contain substantially no polyglycol by-products. Especially suitable are alkylene oxide condensation products that contain no more than about 0.5% by weight of polyglycols having a molecular weight greater than 1000.

Non-ethoxylated nonionic surface active agents suitable for use in preparing phosphate esters in accordance with the practice of the present invention are hydroxylic organic compounds containing at least 6 carbon atoms and a reactive hydrogen atom. As suitable compounds there may be mentioned aliphatic alcohols, both straight chain and branched chain, as, for example, 2-ethylhexanol, octanol, decanol, dodecanol and octadecanol; cycloaliphatic alcohols, as, for example, cyclohexanol and cycloheptanol; higher fatty alcohols having at least 8 carbon atoms obtainable from the various fatty acids or glycerides; and multi-branched chain primary alcohols having the molecular configuration of an alcohol, produced by the oxo process from a polyolefin, of at least 7 carbon atoms.

Phosphate esters prepared in accordance with the practice of the present invention may be the phosphorylation products of any one of the nonionic surface active agents hereinabove described or mixtures thereof and such mixtures fall within the scope of the present invention.

In carrying out the phosphation reaction in accordance with this invention $P_2O_5$ is the preferred phosphating agent. One mole of $P_2O_5$ is reacted with about 2 to 4.5 moles of the nonionic surface active agent hereinabove described at a temperature no higher than about 110° C. and preferably between about 35 and 65° C. and under substantially anhydrous conditions.

After phosphorylation is complete, at least about 0.5% by weight and preferably between about 1% and 3% by weight of water based on the weight of the reaction batch is added and hydrolysis is allowed to proceed for a period of time that may range from about 1 to 4 hours at ambient temperatures up to about 150° C. and preferably between about 60° C. and 110° C., and the reaction batch is then cooled to about 30° C. The hydrolysis step has the surprising and unexpected effect of decomposing polyphosphates formed during phosphorylation without hydrolyzing the phosphate ester product, practically eliminating the pH drift problem usually encountered on storage and significantly improving the product color.

The products of the present invention may be supplied in the free acid form, or in the form of the partially or completely neutralized salts containing as cations alkali metals, alkaline earth metals, ammonium and organic amines. Use in the form of such salts is in some instances preferred or necessary, as for example when employed in alkaline surface active compositions or applications such as dry cleaning detergents where thermal stability is a requirement.

Neutralization of the phosphate ester may be accomplished using numerous known materials and well known methods. It is particularly desirable for applications requiring high temperature stability that water added during the neutralization step be efficiently and rapidly removed. A particularly advantageous procedure for neutralizing the phosphate ester prepared in accordance with the present invention is carried out by adding a 50% sodium hydroxide solution in an amount based on stoichiometric considerations and the ultimate pH desired to the hydrolyzed phosphate ester with vigorous agitation while maintaining the batch temperature between about 40° C. and 60° C. The neutralized batch is then cooled to about 30° C. and fed into a thin film vacuum stripper where the water is rapidly removed at a temperature of about 90° C. to obtain a product containing less than about 0.5% water by weight.

Any suitable compound containing the desired alkali metal, alkaline earth metal, ammonium or organic amine substituent may be employed to prepare the neutral salt of the phosphate esters prepared in accordance with the present invention. Use of aqueous sodium hydroxide solutions has been found to be particularly advantageous for this purpose in that water can be readily stripped from the neutralized phosphate ester solution.

Maximum thermal stability of the phosphate ester is realized by removing substantially all the water from the neutralized product. Phosphate ester salts containing more than about 0.5% by weight of water undergo hydrolysis particularly when higher temperatures are encountered, resulting in poor color and loss is clarity as well as increased acidity. Several known techniques are available that will remove water rapidly from the neutralized soltuions, the thin film vacuum stripper being particularly advantageous. It is essential that water be removed as rapidly as possible to prevent hydrolysis of the phosphate ester during this operation.

The products produced in accordance with the practice of the present invention have surface active, foaming, emulsifying, wetting and detergent properties largely dependent upon the particular nonionic surface active agent or agents employed as reactants. These products, in view of the presence therein of phosphate groups, mixtures of primary phosphate esters with secondary phosphate esters containing two nonionic residues, etc. have certain advantages as surface active agents.

The products hereof may be formulated with the usual alkaline substances, builders, soap, suspending agents, brighteners, stabilizers and the like depending upon the particular use contemplated, and are particularly suitable for mixing with commercial organic solvents such as perchloroethylene, stoddard solvent and carbon tetrachloride for use in dry cleaning compositions.

The invention is further illustrated but not limited as to its scope by the following examples wherein all percentages reported are by weight.

EXAMPLE 1

About 3 moles of a 7 mole ethylene oxide adduct of tridecyl alcohol containing about 0.03% water and less than about 0.5% polyglycol was charged into a reaction vessel and heated to about 60° C. One mole of phosphorus pentoxide was added with turbulent agitation while maintaining the temperature at about 60° C. After all the $P_2O_5$ had been added the reaction was run for about 8 hours while maintaining the temperature at about 60° C. A sample of the reaction batch was taken for analysis. About 1.0% by weight of water based on the reaction batch was then added with agitation and the temperature of the batch was raised to about 90° C. The hydrolysis reaction was run for about 4 hours while maintaining about a 90° C. temperature and then cooled to below 30° C. at which time a sample was taken for analysis.

The analysis results are summarized below:

| | After phosphorylation | After hydrolysis |
|---|---|---|
| Water (percent added) | None | 1 |
| Temperature (° C.) | 60 | 90 |
| Time (hours) | 8 | 4 |
| Nonionic (percent) | 14.8 | 14.4 |
| Klett (color) | 270 | 185 |

It can be seen from these results that there is an improvement in the color and there was no hydrolysis of phosphate ester product.

EXAMPLE 2

Example 1 was repeated except that the phosphorylation reaction was carried out at a temperature of 35° C. for 3 hours and 60° C. for 6 hours and the hydrolysis reaction was carried out for 3 hours at 60° C. with 1% of water.

A summary of analysis results is tabulated below:

| | After phosphorylation | | After hydrolysis | |
|---|---|---|---|---|
| Water (percent added) | None | | 1 | |
| Time (hours) | 3 | 6 | 2 | 3 |
| Temperature (° C.) | 35 | 60 | 60 | 60 |
| Nonionic (percent) | | 12.9 | | 12.6 |
| Klett (color) | 88 | 85 | 69 | 65 |
| pH | | 2 | | 2 |

The above results point up the improvement in color afforded by the hydrolysis treatment which was realized without hydrolysis of the phosphate ester product. The lower initial phosphorylation temperature afforded the color improvement of this example as compared to that obtained in Example 1.

Samples of the phosphate ester taken immediately after phosphorylation and after hydrolysis and aged 90 days were analyzed for acidity and the hydrolyzed sample exhibited no increase whereas the sample taken before hydrolysis exhibited a 7.5% increase in acidity.

A sufficient amount of sodium hydroxide as a 50% aqueous solution was added to the hydrolyzed phosphate ester reaction batch prepared above with turbulent agitation while maintaining the batch temperature at about 50° C. After all the sodium hydroxide solution was added the batch was cooled to about 30° C. and fed into a thin film vacuum stripper operating at about 90° C. where the water was removed to a level below about 0.50% by weight. The Klett (color) value for the neutralized batch was determined to be 77.

EXAMPLE 3

3 moles of a 6 mole ethylene oxide adduct of nonylphenol containing about 0.02% water and less than about 0.5% polyglycols was charged into a reaction vessel and heated to about 60° C. One mole of $P_2O_5$ was added with turbulent agitation while maintaining the temperature at about 60° C. After all the $P_2O_5$ had been added the reaction was permitted to proceed for about 4¼ hours while maintaining the temperature at about 60° C. A sample of the reaction batch was taken for analysis. About 1.0% by weight of water based on the reaction batch was then added and the temperature of the batch was raised to about 90° C. The hydrolysis reaction was run for about 2 hours and then the batch was cooled to below 30° C. at which time a sample was taken for analysis.

The analysis results are summarized below:

|  | After phosphorylation | After hydrolysis |
| --- | --- | --- |
| Water (percent added) | None | 1.0 |
| Nonionic (percent) | 4.7 | 4.4 |
| Klett (color evaluation) | 224 | 157 |
| Acidity (90 day aging) | +5% | (¹) |

¹ No increase.

It can be seen from these results that the color was improved and there was no increase in nonionic showing that hydrolysis of the phosphate ester did not occur.

EXAMPLE 4

(a) Phosphorylation

A mixture of nonionics was provided consisting of 641 grams of ethoxylated linear aliphatic primary alcohol ($C_{10}$, $C_{12}$, and $C_{14}$ alkyl radicals) containing 63% by weight ethylene oxide, and 686 grams branched chain ethoxylated nonyl phenol containing 55% by weight ethylene oxide. This mixture was charged to the reaction vessel and 142 grams of phosphorous pentoxide was added with agitation while maintaining a pot temperature of 40–50° C. After all the $P_2O_5$ was added the temperature was increased to 60–65° C. and the reaction batch held at this temperature for 6 hours, after which time the phosphorylation was completed as indicated by a $P_2O_5$ analysis (as $H_3PO_4$) of about 0.5% by weight and an unreacted nonionic analysis of about 10% by weight.

(b) Hydrolysis

Approximately 1% by weight (based on the reaction batch) water was added to the reaction batch which was then heated for two hours at 90° C. The batch was then allowed to cool to 30° C.

(c) Neutralization

Sufficient 50% sodium hydroxide solution was added to neutralize the phosphate ester and bring the pH of the aqueous solution to about 6.5. The NaOH solution was added over about a 10 minute period while agitating the reaction batch with cooling so as to maintain a temperature of 40–60° C. During this neutralization, the temperature should not be allowed to fall below 40° C., since the mixture has a tendency to gel during the addition of NaOH at cooler temperatures. After neutralization the aqueous solution was immediately transferred to a thin film vacuum stripper (Asco Rota-Film Molecular Still having a 0.35 sq. ft. available evaporating area) and the water was flashed off over a 30 minute period at a temperature of 90–110° C. A clear almost colorless solution was obtained when about 10 parts of neutralized phosphate ester of this example as mixed with 90 parts of perchloroethylene solvent.

A sample of the phosphate ester taken upon completion of phosphorylation and aged 120 days at room temperature exhibited a 13.8% increase in acidity whereas a sample taken after hydrolysis exhibited no increase in acidity after aging 120 days.

EXAMPLE 5

Following the procedure of Example 4, phosphate esters were prepared using as reactants the mixtures of alcohols listed below:

(A) 641 g. of the linear aliphatic alcohol ethoxylate of Example 4 and 880 g. of ethoxylated linear nonylphenol containing 64% by weight ethylene oxide.

(B) 544 g. ethoxylated linear aliphatic primary alcohol ($C_{10}$ and $C_{12}$ alkyl radicals) containing 60% by weight ethylene oxide and 293 g. 2-ethylhexanol.

(C) 1,052 g. ethoxylated linear dodecyl phenol containing 54% by weight ethylene oxide and 293 g. 2-ethylhexanol.

(D) 489 g. ethoxylated linear aliphatic primary alcohol ($C_{12}$, $C_{13}$, $C_{14}$, and $C_{15}$ alkyl radicals) containing 39% by weight ethylene oxide and 293 g. 2-ethylhexanol.

Clear, almost colorless, stable solutions of phosphate ester compositions A, B, C, and D of this example were prepared by mixing with perchloroethylene. Samples of compositions A, B, C and D taken immediately following the hydrolysis treatment exhibited no increase in acidity after aging 120 days at room temperature.

EXAMPLE 6

A neutralized phosphate ester was prepared according to the procedure of Example 4 from an equimolar mixture of the 7 mole ethylene oxide adduct of tridecyl alcohol and the 9 mole ethylene oxide adduct of nonylphenol. A 100 gram liquid sample was placed in an oven at 45–50° C. This sample had a water content of about 0.5% by weight and was compared with samples of the same phosphate ester containing the amounts of water noted below:

| Percent by weight water: | Days before hazing |
| --- | --- |
| 0.5 | 43 |
| 1.0 | 18 |
| 1.5 | 16 |
| 2.0 | 16 |

The hazing, evidencing instability, is due to the precipitation of sodium phosphate formed as the result of hydrolysis of the phosphate ester.

What is claimed is:

1. A process for improving the color stability and substantially reducing the acid drift of phosphate ester surface active compositions which comprises:
   (a) reacting 1 mole of $P_2O_5$ with 2 to 4.5 moles of nonionic surface active agent selected from the group consisting of linear and branched chain saturated alcohols containing from 6 to 18 carbon atoms, mono- and dialkyl phenols wherein the alkyl group contains from 4 to 20 carbon atoms and the 2 to 14 mol alkylene oxide adducts of said alcohols and alkyl phenols wherein the alkylene oxide is a member of the group of ethylene oxide, butylene oxide and propylene oxide, and mixtures thereof under substantially anhydrous conditions at a temperature between about 25° C. and 110° C.;
   (b) hydrolyzing the phosphate ester reaction batch with between about 0.5% to 3.0% by weight of water at a temperature between about 60° C. and 110° C.
   (c) then neutralizing the phosphate ester with basic solution containing a member selected from the group consisting of alkali metal, alkaline earth metal, ammonium and organic amine ions; and
   (d) rapidly removing water from the neutralized phosphate ester reaction batch so that the neutralized product contains less than about 0.5 water by weight.

2. A process for improving the color stability and substantially reducing the acid drift of phosphate ester surface active compositions which comprises:
   (a) reacting 1 mole of $P_2O_5$ with 2 to 4.5 moles of a nonionic surface active agent selected from the group consisting of a condensation product of between about 4 and 12 moles of ethylene oxide and one mole of linear or branched chain saturated aliphatic alcohols containing from 8 to 18 carbon atoms, a condensation product of between about 6 and 14 moles of ethylene oxide and one mole of alkyl phenols containing from 4 to 20 carbon atoms in the alkyl radical and mixtures thereof under substantially anhydrous conditions at a temperature between about 25° C. and 110° C.;
(b) hydrolysing the phosphate ester reaction batch with between about 0.5% to 3.0% by weight of water at a temperature between about 60° C. and 110° C.; and
(c) then neutralizing the phosphate ester with an aqueous solution containing about 50% by weight of sodium hydroxide; and
(d) then rapidly removing water from the neutralized phosphate ester reaction batch so that the neutralized product contains less than about 0.5% by weight of water.

References Cited
UNITED STATES PATENTS

| | | | |
|---|---|---|---|
| 3,004,056 | 10/1961 | Nunn et al. | 260—950 |
| 3,117,152 | 1/1964 | Michaels | 260—950 X |

ANTON H. SUTTOL, Primary Examiner

U.S. Cl. X.R.

252—89, Dig. 17; 260—924, 925, 950, 951, 980